April 23, 1929.  R. E. MARTIN  1,710,232
CULTIVATOR
Filed March 14, 1928  3 Sheets-Sheet 1

Inventor
R. E. Martin,
By J. Stanley Burch
Attorney

April 23, 1929.   R. E. MARTIN   1,710,232
CULTIVATOR
Filed March 14, 1928   3 Sheets-Sheet 2
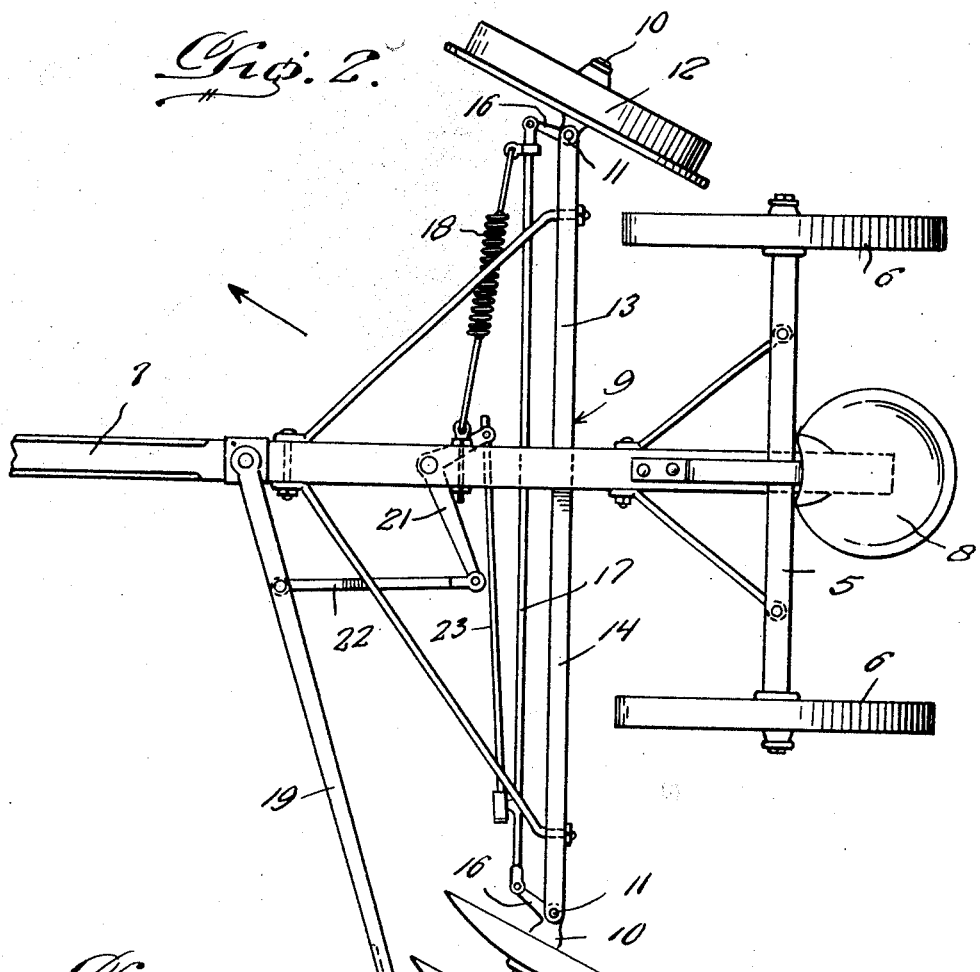
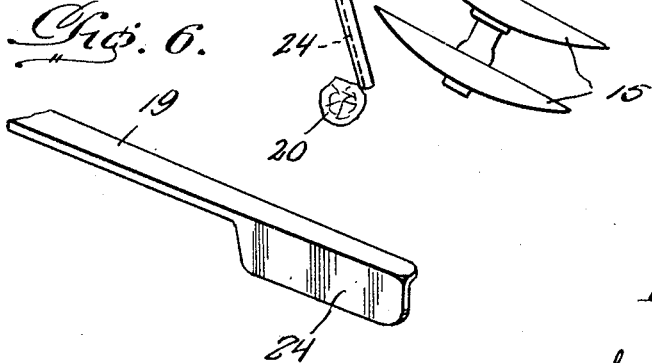
Inventor
R. E. Martin,
By J. Stanley Burch
Attorney

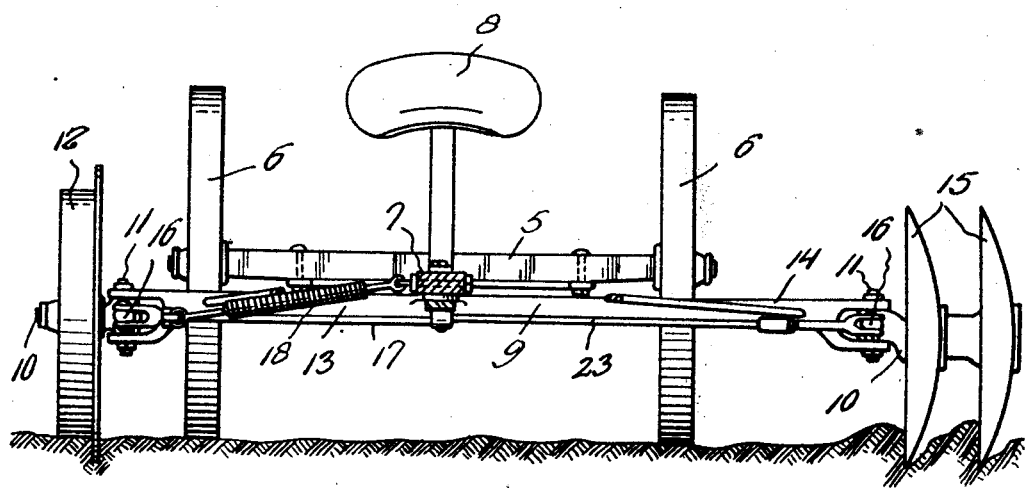
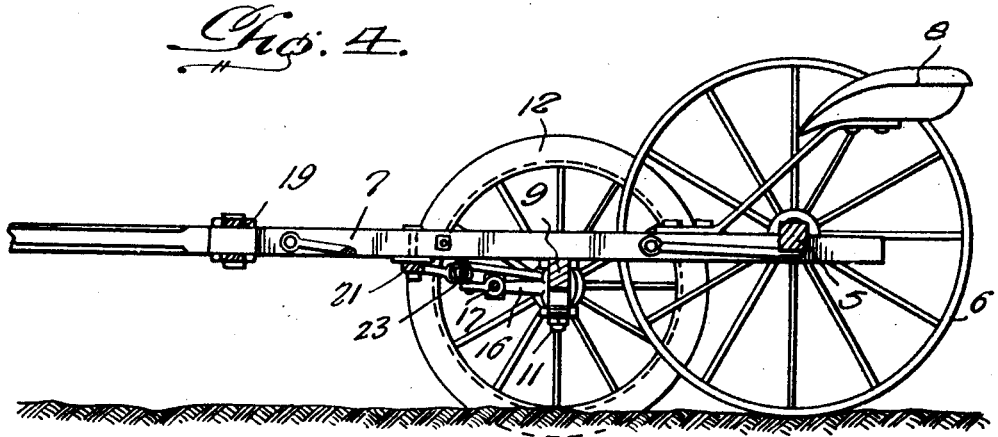
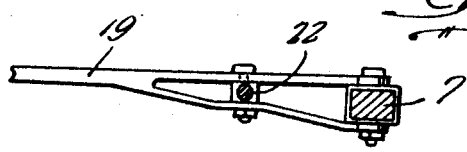

Patented Apr. 23, 1929.

1,710,232

UNITED STATES PATENT OFFICE.

ROBERT E. MARTIN, OF PORTERVILLE, CALIFORNIA.

CULTIVATOR.

Application filed March 14, 1928. Serial No. 261,550.

This invention relates to cultivators, and has more particular reference to an improved outrigger cultivator especially adapted for use in cultivating to the center of a row of trees and vines in an orchard.

The primary object of the present invention is to provide means for automatically steering the cultivator laterally as the cultivator disks approach the trunks of the trees or vines, thereby causing the disks to pass around the trunks without injuring the latter.

A further object is to provide a cultivator of the above character which is simple and durable in construction, and efficient in use.

A more specific object is to mount the cultivator disks on a steering axle, to provide means to normally position the steering axle with the disks parallel with the line of draft, and to provide a member in advance of the disks adapted to be moved by engagement with the trunk of the tree or vine for deflecting the disks at an angle to the line of draft so as to cause the cultivator to be steered laterally and consequently cause the disks to pass around or by the trunk without injuring the latter.

The invention consists in the novel form, combination and arrangement of parts hereinafter more fully described, shown in the accompanying drawings, and claimed.

In the drawings;

Figure 2 is a view similar to Figure 1, with the cultivator disks deflected at an angle to the line of draft after the steering lever has engaged the tree trunk.

Figure 3 is a transverse section on line 3—3 of Figure 1.

Figure 4 is a longitudinal section on line 4—4 of Figure 1.

Figure 5 is a fragmentary transverse section on line 5—5 of Figure 1; and

Figure 6 is a fragmentary perspective view, showing the outer end of the steering lever.

Figure 1:
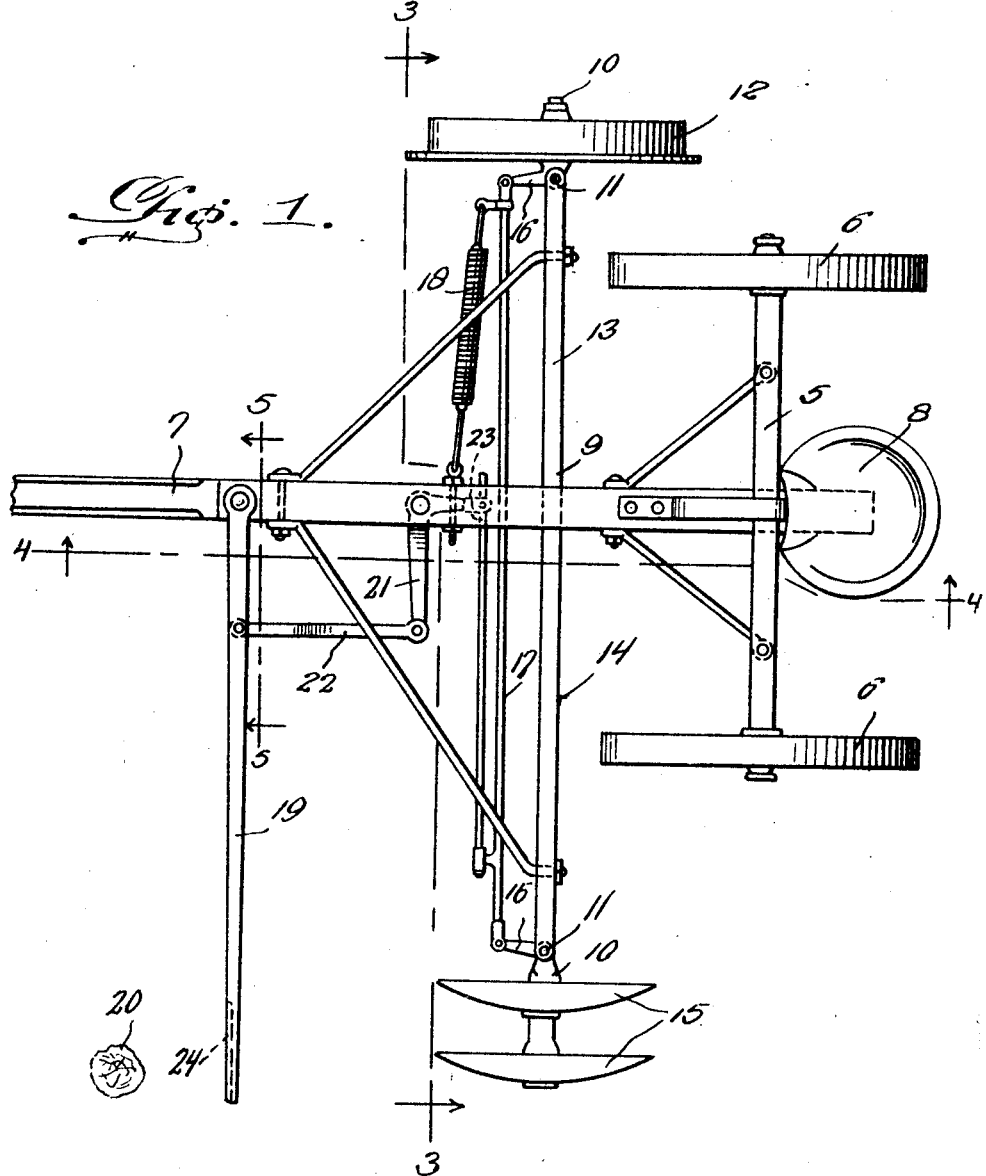
Figure 1 is a top plan view of a cultivator embodying the present invention.

Referring more in detail to the drawings, 5 indicates a rear axle having supporting wheels 6 journaled on the ends thereof and provided with a central rigid forwardly projecting tongue 7 to which the draft animals are suitably hitched, a seat 8 being mounted on the rear end of the tongue to accommodate the driver or attendant of the cultivator.

Fixed to the tongue 7 directly in front of the wheels 6 is a stationary transverse front axle 9 having horizontally swinging steering spindles or stub-axles 10 pivoted to the ends thereof as at 11. The axle 9 is attached to the tongue 7 at a point between the transverse center of said axle 9 and a flanged steering wheel 12 journaled on one of the stub-axles 10, thereby providing a short portion 13 of the axle 9 which carries the spindle 10 for the wheel 12 and a longer outrigger port 14 which carries the other spindle 10 on which are journaled a plurality of cultivator disks 15. Both portions of the axle 9 are longer than corresponding portions of the rear axle 5 so that the axles may be placed close to each other and so that lateral tilting of the implement is effectively prevented.

The stub axles or spindles 10 have forwardly projecting steering arms 16 connected by a connecting rod 17, and connecting the end of the rod 17, adjacent the wheel 12, with the tongue 7 is an elastic tension device 18 which normally yieldingly positions the stub axles 10 with the disks 15 and wheels 12 parallel with the tongue 7 and the line of draft, as shown in Figure 1. A horizontal outrigger steering lever 19 is pivoted at one end to the tongue 7 in front of the axle 9 for horizontal swinging movement, and this lever is normally disposed to project laterally in front of the outrigger portion 14 of the axle 9 substantially at right angles to the tongue 7. The lever 19 has its free end disposed in advance of the disks 15, so that it will engage the trunk 20 of a tree or vine as the disks 15 approach the trunk in the forward travel of the implement, and so that said lever is swung rearwardly as shown in Figure 2 as the implement continues to travel ahead. The lever 19 is operatively connected to the rod 17 so that when said lever is thus swung rearwardly, the stub axles 10 will be swung to position the disks 15 and wheel 12 at an angle to the line of draft as shown in Figure 2, thereby steering the implement laterally away from the trunk 20 and causing the disks 15 to pass by the latter without injuring the same. For this purpose, a bell crank lever 21 is pivoted to the tongue 7 between the lever 19 and rod 17, and one arm of this bell crank lever is connected to the intermediate portion of the lever 19 by a link 22, while the other arm of said bell crank lever is connected to the stub axle 10 adjacent the disks 15 by a steering rod 23. As soon as the end of the lever 19 passes the trunk 20, the tension device 18 will return the disks 15 and wheel 12 to normal position, the sudden return shifting the implement back to a point where the disks operate at the center of the row or in the path of the trunks.

In order to avoid injury to the trunk when the free end of the lever 19 engages the same, said end of the lever has a wide depending flange 24 at its forward edge adapted to present a broad bearing surface which will not readily cut or scar the trunk.

It will be readily seen that the invention provides simple and efficient means to automatically prevent the cultivator disks from striking and injuring the trunks of the vines and trees in a row when cultivating to the center of the row, thereby positively insuring the desired function without relying on the accuracy or alertness of the attendant or requiring any manual effort on his part.

Minor changes may be made without departing from the spirit and scope of the invention as claimed.

What I claim as new is:

1. A tree or vine cultivator including a tongue, a transverse axle attached to the tongue and having stub-axles pivoted to its ends, a ground-engaging steering wheel on one of said stub-axles, cultivator disks on the other of said stub-axles, yieldable means to normally position the stub axles with the steering wheel and cultivator disks parallel with the tongue, and means including an actuating member arranged directly in advance of the cultivator disks for engaging the trunk of a tree or vine and deflecting the stub-axles to steer the disks around said trunk upon forward travel of the cultivator.

2. A tree or vine cultivator including a tongue, a transverse axle attached to the tongue and having stub-axles pivoted to its ends, a ground-engaging steering wheel on one of said stub-axles, cultivator disks on the other of said stub-axles, yieldable means to normally position the stub-axles with the steering wheel and cultivator disks parallel with the tongue, and means including an actuating member arranged directly in advance of the cultivator disks for engaging the trunk of a tree or vine and deflecting the stub-axles to steer the disks around said trunk upon forward travel of the cultivator, said actuating member embodying a horizontal lever pivoted to and projecting laterally from said tongue.

3. A tree or vine cultivator including a tongue, a transverse axle attached to the tongue and having a stub-axle pivoted to its ends, a ground-engaging steering wheel on one of said stub-axles, cultivator disks on the other of said stub-axles, yieldable means to normally position the stub-axles with the steering wheel and cultivator disks parallel with the tongue, and means including an actuating member arranged directly in advance of the cultivator disks for engaging the trunk of a tree or vine and deflecting the stub-axles to steer the disks around said trunk upon forward travel of the cultivator, said stub-axles having forwardly projecting steering arms, and a rod connecting said steering arms, said yieldable means embodying an elastic tension device connecting said connecting rod to the tongue.

4. A tree or vine cultivator including a tongue, a transverse axle attached to the tongue and having stub-axles pivoted to its ends, a ground-engaging steering wheel on one of said stub-axles, cultivator disks on the other of said stub-axles, yieldable means to normally position the stub-axles with the steering wheel and cultivator disks parallel with the tongue, and means including an actuating member arranged directly in advance of the cultivator disks for engaging the trunk of a tree or vine and deflecting the stub-axles to steer the disks around said trunk upon forward travel of the cultivator, said stub-axles having forwardly projecting steering arms, and a rod connecting said steering arms, said yieldable means embodying an elastic tension device connecting said connecting rod to the tongue, a bell crank lever pivoted to the tongue, a link connecting one arm of the bell crank lever to said actuating member, and a steering rod connecting the other arm of said bell crank lever to said connecting rod.

5. A tree or vine cultivator provided with an outrigger steering axle having cultivator disks thereon, and an outrigger steering member arranged in advance of said cultivator disks and operatively connected to said steering axle for engaging the trunk of a tree or vine and deflecting the disks at an angle to the line of draft as the disks approach said trunk during the forward travel of the cultivator, and yieldable means to normally position the steering axle with the disks parallel with the line of draft.

6. A tree or vine cultivator provided with an outrigger steering axle having cultivator disks thereon, and an outrigger steering member arranged in advance of said cultivator disks and operatively connected to said steering axle for engaging the trunk of a tree or vine and deflecting the disks at an angle to the line of draft as the disks approach said trunk during the forward travel of the cultivator, and yieldable means to normally position the steering axle with the disks parallel with the line of draft, said axle having a longer portion at the side of the tongue at which the disks are disposed.

7. A tree or vine cultivator provided with an outrigger steering axle having cultivator disks thereon, and an outrigger steering member arranged in advance of said cultivator disks and operatively connected to said steering axle for engaging the trunk of a tree or vine and deflecting the disks at an angle to the line of draft as the disks approach said trunk during the forward travel of the cultivator, and yieldable means to normally position the steering axle with the disks parallel with the line of draft, said axle having a longer portion at the side of the tongue at which the disks are disposed, and a shorter axle rigid with the tongue and disposed directly at the rear of said first-named axle and having supporting wheels on the ends thereof, the portions of the first-named axle at both sides of the tongue being longer than corresponding portions of the rear axle.

8. A tree or vine cultivator including a tongue, a transverse axle attached to the tongue and having stub-axles pivoted to its ends, a ground-engaging steering wheel on one of said stub-axles, cultivator disks on the other of said stub-axles, yieldable means to normally position the stub-axles with the steering wheel and cultivator disks parallel with the tongue, and means including an actuating member arranged directly in advance of the cultivator disks for engaging the trunk of a tree or vine and deflecting the stub-axles to steer the disks around said trunk upon forward travel of the cultivator, said actuating member embodying a horizontal lever pivoted to and projecting laterally from said tongue, and a wide flat trunk engaging element on the free end of said lever.

In testimony whereof I affix my signature.

ROBERT E. MARTIN.